April 8, 1947.   R. S. ROGERS, JR   2,418,726
LOG HANDLING APPARATUS
Filed Jan. 16, 1945   4 Sheets-Sheet 1

Inventor
Robert S. Rogers, Jr.
By Bacon & Thomas
Attorneys

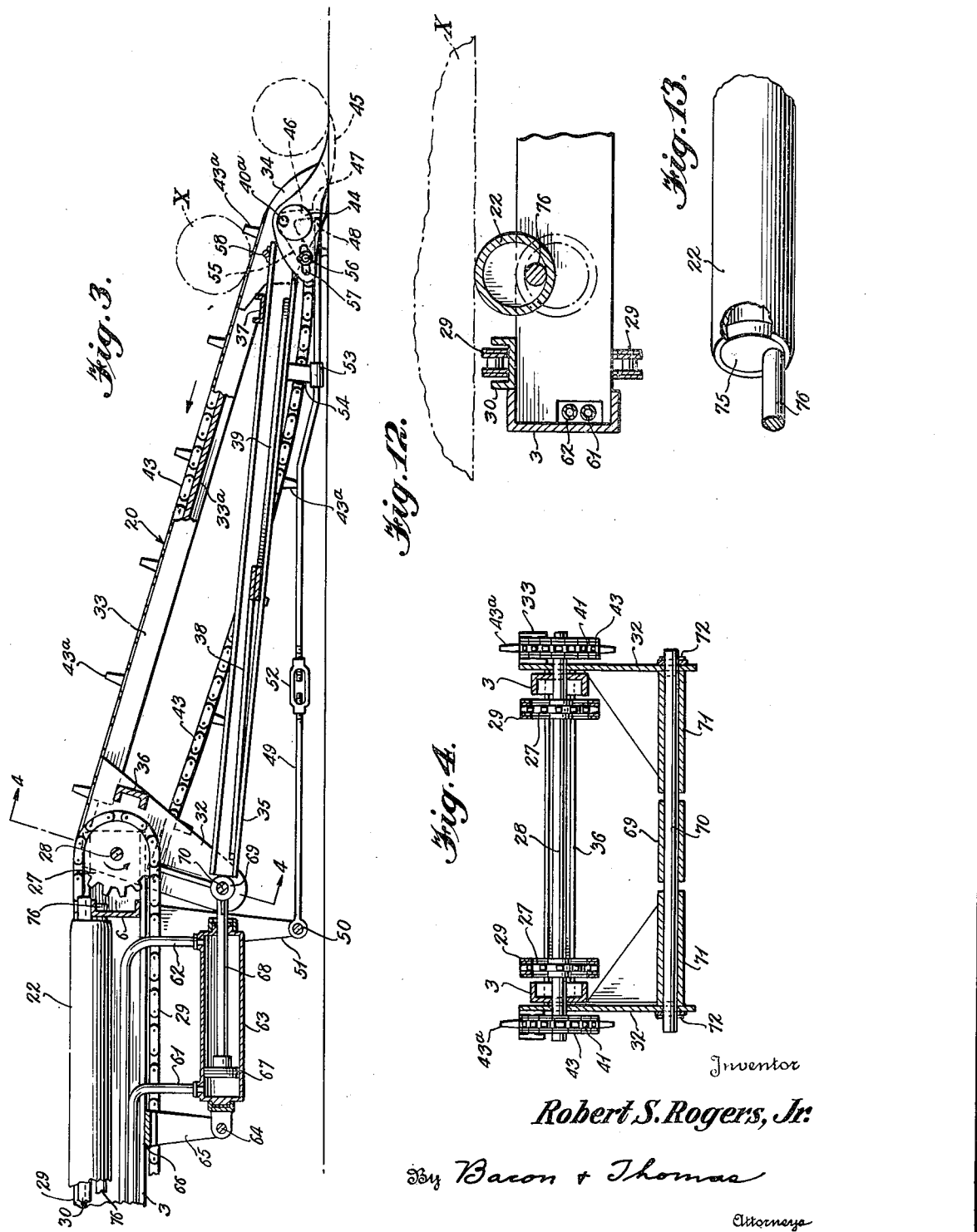

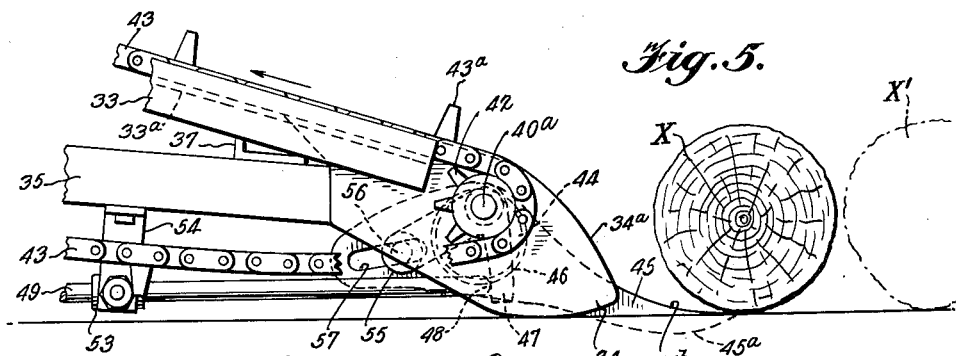
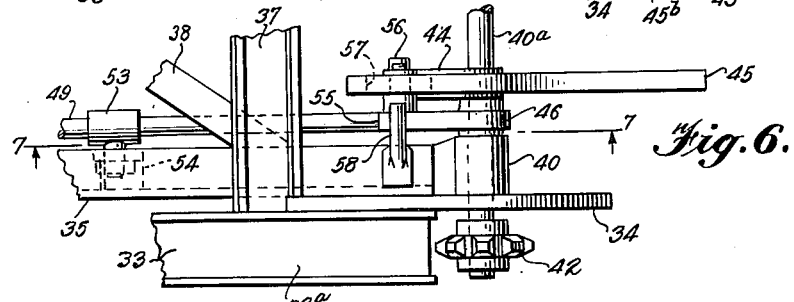
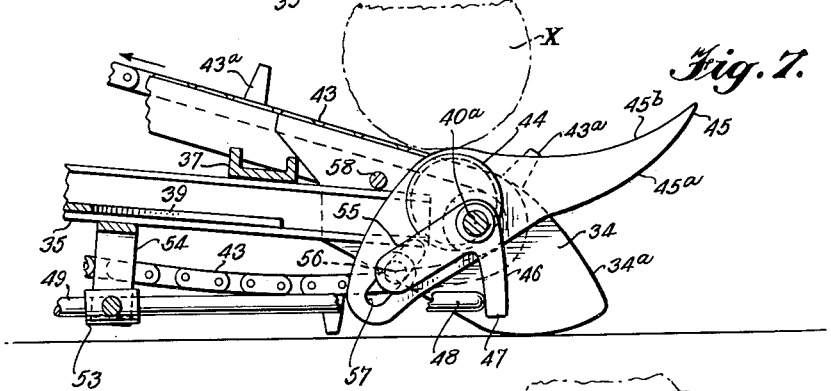
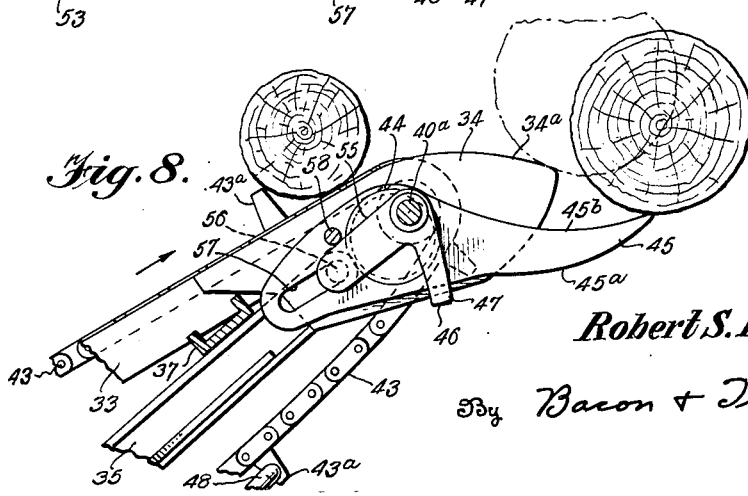

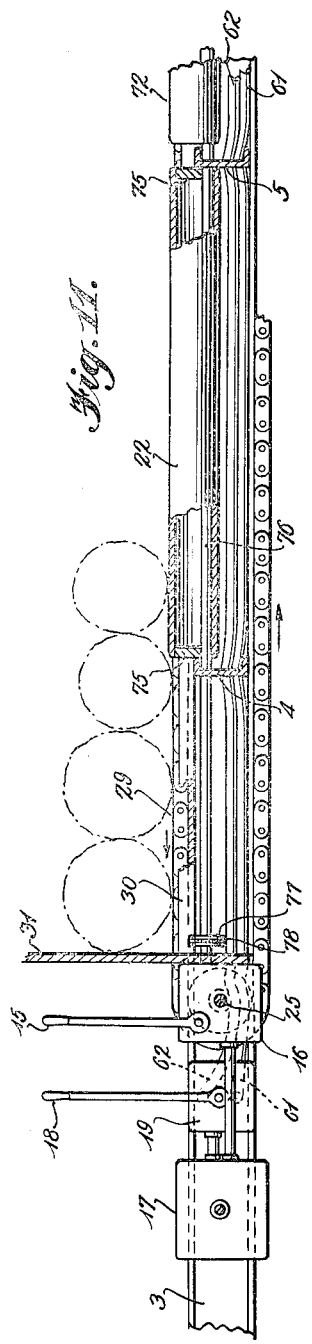
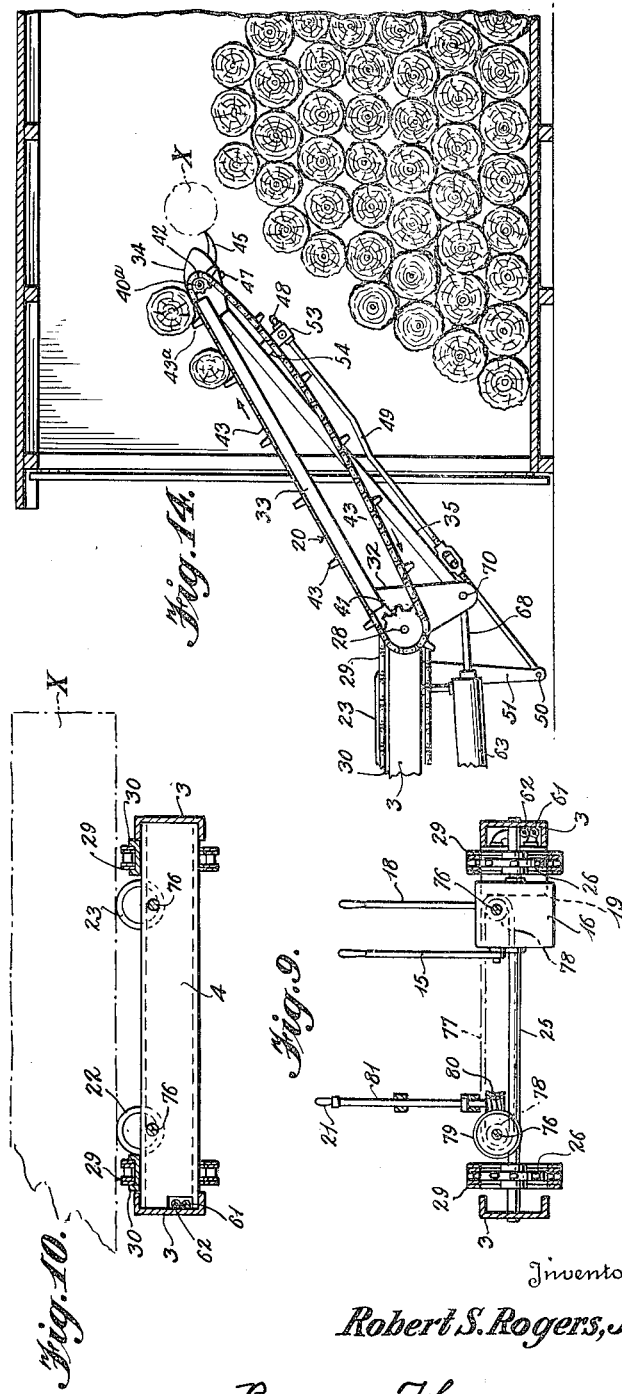

Patented Apr. 8, 1947

2,418,726

UNITED STATES PATENT OFFICE 2,418,726

LOG HANDLING APPARATUS

Robert S. Rogers, Jr., Cheraw, S. C.

Application January 16, 1945, Serial No. 573,080

15 Claims. (Cl. 214—83)

The present invention relates to a combined vehicle and loading and unloading apparatus, and more particularly to a self-propelled apparatus for loading, transporting, and unloading and stacking logs and the like.

Briefly, the invention comprises a self-propelled vehicle having a chassis provided with a pivoted ramp at the rear end thereof that can be lowered so that loading fingers at the rear end of the ramp can engage under a log and be simultaneously reciprocated to project the same under said log and oscillated to raise said log to a position where ramp chains having lugs thereon can operatively engage said log and move it up the ramp and onto conveying chains arranged longitudinally of the chassis of the vehicle. Log elevating and lowering mechanism is arranged adjacent the conveying chains on the chassis and is operable to elevate the logs to relieve the conveying chains of the dead weight of said logs. The elevating means is preferably manually adjustable so that the conveying chains force successive logs onto the elevating means and then cause them to slide forwardly along said elevating means as successive logs are loaded. The loaded vehicle is then driven to the point where the logs are to be unloaded. In unloading the vehicle, the ramp may be adjusted to any angular position by a hydraulic cylinder. The direction of travel of the conveying chains and the ramp chains is then reversed so that the logs are conveyed to the ramp chains by the conveying chains and the ramp chains then carry the logs to the rear end of the ramp for discharge onto the ground or onto a pile of previously unloaded logs. If the logs are to be steamed, they can be stacked in a steam house by the ramp to any height desired. The log elevating mechanism is manipulated as desired to raise and lower the logs relative to the conveying chain in order to properly feed the logs to the ramp chains.

The principal object of the invention is to provide relatively simple apparatus for loading, transporting, and unloading and stacking elongated members such as logs and the like, whereby to eliminate the loss of time and expense incident to manual loading, unloading and stacking of the logs.

Another object of the invention is to provide mechanical means capable of both loading logs onto a mobile support and unloading and stacking said logs.

A more specific object of the invention is to provide apparatus for picking up logs from the ground and loading them onto a vehicle.

Another specific object of the invention is to provide apparatus for unloading logs and the like from a vehicle and depositing the same upon the ground or stacking the same upon other logs to any desired height.

A further object of the invention is to provide mechanical means for picking up logs from the ground, loading the same onto a vehicle for transportation and then unloading and stacking the same in a building for treatment, such as steaming, or for storage.

Other objects and features of the invention will be apparent from the following description taken in conjunction with the accompanying drawings, in which:

Fig. 3 is an enlarged fragmentary sectional view taken on the line 3—3 of Fig. 2;

Fig. 4 is a sectional view taken on the lines 4—4 of Figs. 1 and 3.

Fig. 5 is an enlarged fragmentary view of the rear end of the ramp with the loading fingers in the position that they assume to pick up a log from the ground for loading onto the ramp;

Fig. 6 is a plan view of the apparatus shown in Fig. 5;

Fig. 7 is a sectional view taken on the line 7—7 of Fig. 6, but showing the loading fingers in the position that they assume to deliver a log to the ramp chains;

Fig. 8 is a view similar to Fig. 7 but illustrating the ramp elevated, with the loading fingers in the position that they assume to permit unobstructed unloading of the logs by the ramp chains;

Fig. 9 is a diagrammatic sectional view taken on the line 9—9 of Fig. 1 illustrating certain control elements of the apparatus;

Fig. 10 is a transverse sectional view taken on the line 10—10 of Fig. 2 illustrating a portion of the mechanism provided for elevating the logs above the conveying chains in order to relieve said chains of the dead weight of said logs;

Fig. 11 is an enlarged longitudinal sectional view taken on the line 11—11 of Fig. 2 illustrating certain details of the log elevating mechanism;

Fig. 12 is an enlarged detail sectional view illustrating the log elevating apparatus in its raised position in full lines and its retracted position in dot and dash lines;

Fig. 13 is an enlarged perspective view of a portion of one of the elements of the log elevating mechanism; and Fig. 14 is a view illustrating the manner in which the ramp may be elevated to unload and stack logs at a desired height in a building for storage or treatment.

Figure 1:
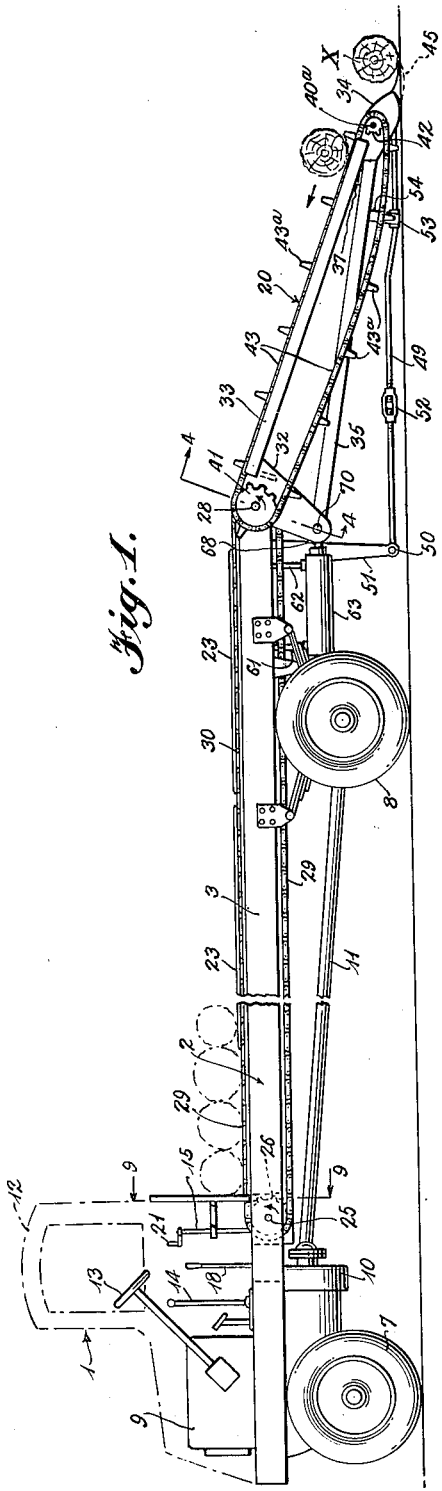
Fig. 1 is a somewhat schematic side elevational view of a log handling apparatus constructed in accordance with the principles of the invention.
Figure 2:
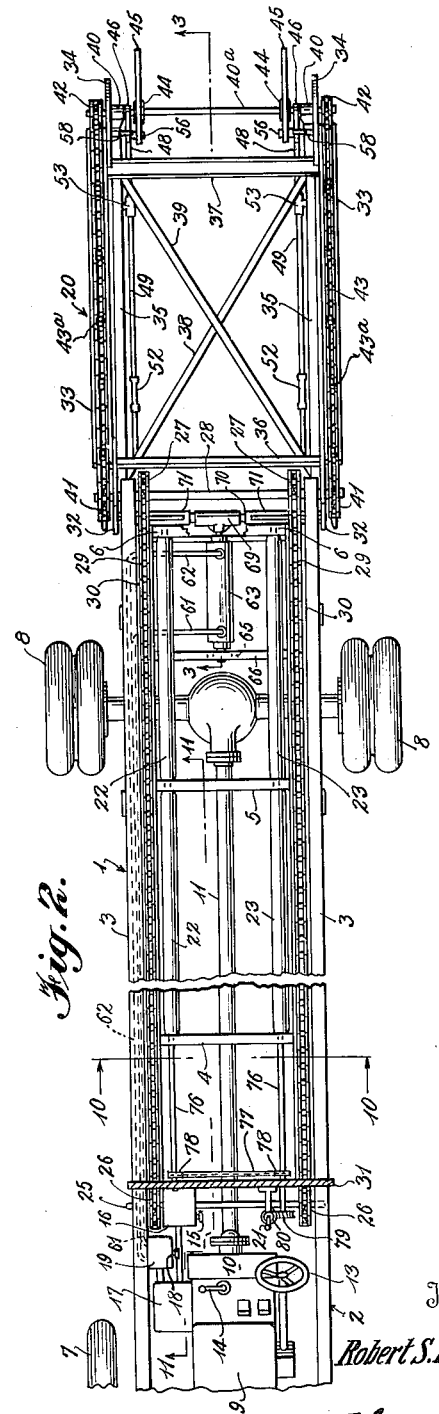
Fig. 2 is a plan view of the log handling apparatus shown in Fig. 1.

Referring now to Figs. 1 and 2 of the drawings, the numeral 1 generally indicates a self-propelled vehicle including a chassis 2 comprising a pair of longitudinally extending side channels 3 interconnected by a series of transverse channel members 4, 5 and 6. The chassis is supported by front wheels 7, and rear wheels 8 driven from an engine 9 through a conventional transmission 10 and propeller shaft (not shown) contained in a tube 11. A cab 12 is located at the forward end of the vehicle 1 and provides a shelter for the operator as well as a housing for the usual steering wheel 13, gear shift lever 14, etc. The cab 12 also contains a control lever 15 associated with a conventional reversing gear mechanism 16 connected with a conventional power take-off 17. A control lever 18 in the cab 12 is associated with a conventional, positive hydraulic control box 19 controlling the raising and lowering of the free end of a ramp 20 located at the rear end of the chassis 2, all as will be described in further detail later. A crank handle 21 is also located in the cab 12 for manually raising and lowering log elevating and supporting members 22 and 23, as will also be described in detail later.

The conventional reversing mechanism 16 is arranged to drive a transversely extending shaft 25 having a pair of sprockets 26 fixed thereto at a point just inside the side channels 3. The sprockets 26 are arranged to drive a pair of sprockets 27 fixed to a transverse shaft 28 located at the rear end of the chassis 2 through conveying chains 29 arranged longitudinally of said chassis. The upper run of each of the chains 29 is arranged so that the lower surface thereof slides along and is supported by the bottom of a channel 30 (Figs. 1 and 10) extending from a point adjacent the sprockets 27 at the rear end of the chassis 2 to an abutment plate 31 adjacent the cab 12, the channels 30 being preferably welded to the abutment plate 31 and to the transverse members 4, 5 and 6 to maintain the same in place. It will be observed from Fig. 10 that the upper surfaces of the conveying chains 29 lie in a horizontal plane above the upper edges of the side channels 3 so that the chains 29 can convey a log X along the chassis 2 without having the log engage the top flange of said side channels.

The ramp 20 is essentially a rigid frame structure pivoted for limited angular rotation about the shaft 28 at the rear end of the chassis 2. This frame comprises generally triangular plates 32 which are positioned on the shaft 28 just outside of the side channels 3 and are free to rotate upon said shaft. I-beams 33, with their flanges disposed vertically, are aligned with the upper edge of the triangular plates 32 and the inner flanges thereof are welded to the outer sides of said plates. The I-beams 33 extend rearwardly from the plates 32 and have skids 34 welded to the inner flanges thereof. The frame 20 includes channel-shaped braces in the form of struts 35 which have their backs welded to the inner surfaces of the plates 32 and to the inner surfaces of the skids 34. The I-beams 33 are connected together at their forward ends by a channel 36 and the struts 35 are connected together at the rear end of the ramp 20 by a channel member 37 resting upon the top flanges of said struts. The ramp 20 is further braced against twisting by diagonally disposed members 38 and 39 which are welded or otherwise secured together at their point of crossing and are secured at their ends to the webs of the struts 35.

As is best shown in Figs. 2 and 6, the skids 34 are provided with bosses 40 which serve as bearings for a third shaft $40^a$. The shaft 28 has a second pair of sprockets 41 mounted thereon at a point outwardly of the triangular plates 32. The sprockets 41 drive sprockets 42 fixed to the shaft $40^a$ through ramp chains 43. Each of the ramp chains 43 is provided with a plurality of lugs $43^a$ which are about 3 inches in height and spaced about 18 inches apart. The lower surface of the upper run of the chains 43 is slidably supported by the upper surface of the webs $33^a$ of the I-beams 33. The shaft $40^a$ has a pair of conventional eccentrics 44 mounted thereon inwardly of the skids 34 and these eccentrics operate log lifting fingers 45, which are adapted to be projected beneath a log on the ground and oscillated in order to elevate the same for loading via the ramp 20 onto the vehicle 1. Bell crank levers 46 are pivotally mounted upon the shaft $40^a$ at a point between the bosses 40 of the skids 34 and the eccentrics 44. Each of the bell crank levers 46 has an arm 47 which abuts against one end 48 of a rod 49. The opposite end of the rod 49 is pivotally mounted at 50 (Fig. 1) upon the lower end of a bracket 51 depending from the chassis side members 3. A turnbuckle 52 is arranged in each of the rods 49 so that the overall length of said rods may be adjusted as desired. Each of the rods 49 is slidably supported at a point removed from the end 48 in a swivelled guide 53 carried by a bracket 54 depending from the struts 35.

Each of the bell crank levers 46 has a second arm 55 that carries a pin 56. The pins 56 project into slots 57 formed in the adjacent fingers 45 on the forward side of the shaft $40^a$. A projection 58 is welded or otherwise secured to the upper flange of each of the struts 35 and is adapted to be engaged by the arm 55 of the bell crank 46 during the unloading operation to permit the fingers 45 to assume a non-obstructing position, as will be pointed out more fully hereinafter.

The ramp 20 is adapted to pivot about the shaft 28 so that it can be raised from the position shown in Fig. 1, wherein the fingers 45 project part-way under a log X, to any desirable angular position, such as shown, for example, in Fig. 14. The raising and lowering of the ramp 20 is controlled by the lever 18, previously referred to, associated with the conventional positive hydraulic control mechanism 19. It will be noted from Fig. 2 that flexible conduits 61 and 62 extend from the unit 19 to opposite ends of a hydraulic cylinder 63. The forward end of the cylinder 63 is pivotally mounted at 64 (Fig. 3) upon a bracket 65 secured to a transverse member 66 carried by the side members 3. The cylinder 63 contains a piston 67 connected to a rod 68 which projects through the rear end of the cylinder 63 and is connected with a sleeve 69 mounted upon a shaft 70. The shaft 70 is journaled in bosses 71 (Fig. 4) carried by and projecting inwardly from the plates 32. Lateral displacement of the shaft 70 relative to the bosses 71 is prevented by cotter pins 72. It will be apparent that the piston 67 will be shifted in the cylinder 63 depending upon whether fluid under pressure is being admitted into the cylinder through conduit 61 or conduit 62 and that such admission of operating fluid is controlled by the lever 18 to position and maintain said piston in any desired position of adjustment in said cylinder.

In the normal use of the apparatus, the ramp 20 is lowered under the control of the operator through the manipulation of the control lever 18 to adjust the piston 67 in the hydraulic cylinder 63 so that the lower curved surface 34ᵃ of the skids 34 engages the ground to slide thereover and the pointed end of the fingers 45 can then be forced under the log X to be loaded, as indicated in Figs. 1 and 5. The under surface of the fingers 45 is generally convex as indicated at 45ᵃ in order to avoid all tendency of said fingers to dig in or bury themselves in the ground. It will be understood that the lever 15 associated with the reversing mechanism 16 of the power take-off device 17 will now be so positioned that the shaft 25 will be rotating counterclockwise, as viewed in Fig. 1, thus driving the sprockets 26 and 27 in the same direction with the result that the upper run of the conveying chains 29 and the ramp chains 43 travel in a direction toward the front end of the vehicle 1. The chains 29 and 43 travel at a very slow speed, for example, at the rate of about 18 inches per minute and this affords ample opportunity to manipulate the vehicle 1 in such manner that the fingers 45 will be forced under the log X to be loaded, a distance greater than the radius of the log. Of course, it will be understood that the ramp 20 may be lowered to the desired position of adjustment and the lever 15 positioned in neutral so that the chains and the driving mechanism of the fingers 45 remain stationary until said fingers have been projected under the log X the desired distance.

The eccentrics 44, which operate the fingers 45, have a throw of 3 inches. When the ramp 20 is lowered the arms 47 of the bell cranks 46 automatically engage the ends 48 of the rods 49 to move said bell cranks to locate the pins 56 in a predetermined position and to hold said bell cranks relatively stationary so that the fingers 45 fulcrum about the pins 56 carried by the arms 55 of said bell cranks; the necessary reciprocating movement of the fingers 45 and the accompanying oscillating movement thereof being permitted by the slots 57. The operation of the eccentrics 44 is so correlated or timed with the travel or movement of the lugs 43ᵃ on the ramp chains 43 that one of said lugs on each chain will assume a position to engage the log X immediately after it has been lifted by the fingers 45 and has rolled down the upper surface 45ᵇ of said fingers onto the ramp chains 43, as illustrated in Fig. 7. It will be noted from this figure that the fingers 45 are now in a position such that the log X will have rolled by gravity from the now downwardly inclined surface 45ᵇ of said fingers onto the ramp chains 43, with a lug 43ᵃ immediately behind the log X ready to engage the same and retain it on the chains 43 for movement up the inclined ramp 20.

After the log X has been deposited upon the ramp chains 43, the eccentrics 44 will move the fingers 45 back to the position shown in Fig. 5 so that the vehicle can be backed up or otherwise manipulated to pick up another log X¹ for loading, in the manner previously described.

It will be understood that the ramp chains 43 present the loaded log X to the conveying chains 29 so that they can be moved along the chassis 2 toward the abutment plate 31. The conveying chains 29 carry no lugs corresponding to the lugs 43ᵃ of the ramp chains.

It is desirable to load the vehicle 1 with as many logs as possible and in closer relationship than that permitted by the spacing of the lugs 43 on the ramp chains. In order to accomplish this, means is provided on the chassis 2 for relieving the chains 29 of the dead weight of the logs so that the friction of the conveying chains 29 against the bottom of the channels 30 and the logs is eliminated. The foregoing result is achieved by mounting a series of elevating members 22 and 23 between the transverse frame members 4, 5 and 6 and adjacent the chains 29 in a manner providing for manual operation thereof to raise and lower the logs to any extent desired by the operator. The elevating members 22 and 23 may be formed of sections of pipe, as illustrated in Fig. 13 with the end of the pipe sections closed by a disc 75 arranged so that a rod 76 is eccentrically disposed with respect to the axis of the pipe sections. The discs 75 and rods 76 are preferably welded in place with respect to the pipe section 22 and 23. The rods 76 are suitably journaled in the transverse members 4, 5 and 6 and in the abutment plate 31 and are interconnected for simultaneous rotary movement in a common direction by a chain 77 (Figs. 2 and 9) and a sprocket 78 fixed to each of the rods 76. One of the rods 76 also carries a worm wheel 79 which meshes with a worm 80 fixed on the lower end of a vertical shaft 81 adapted to be manually rotated by the previously mentioned crank 21. Hence, it will be apparent that if the operator rotates the crank 21 the rods 76 will be rotated and the eccentrically mounted members 22 and 23 carried thereby will be raised and lowered to the extent desired. Fig. 12 illustrates the member 22 in its fully raised position in full lines and in its fully retracted position in dot-and-dash lines. By proper adjustment of the members 22 and 23 it will be evident that all or any part of the weight of the logs can be removed from the conveying chains 29. It will also be apparent that by rotating the rods 76 through more than one revolution the entire load can be shifted transversely of the chassis 2, if desired.

It will be clear from Fig. 2 that the elevating members 22 and 23 extend rearwardly to a point adjacent the rear end of the chassis 2 so that the loaded logs are transferred from the ramp chains 43 onto the conveying chains 29 before they reach the elevating members 22 and 23. There is sufficient friction between the conveying chains 29 and the loaded log to permit the chains to slide the log onto the rearmost sections 22 and 23, and as successive logs are transferred to the conveying chains 29 the logs are progressively pushed forward and slide along the members 22 and 23 until the desired loading has been accomplished. Any logs pushed forwardly far enough to be moved off the forward elevating members 22 and 23 will come to rest upon the conveying chains 29 and be conveyed forwardly into engagement with the abutment plate 31 as diagrammatically illustrated in Fig. 1. It will be understood, of course, that the elevating members 22 and 23 may be raised and lowered during loading of the vehicle 1 to facilitate movement of the logs toward the front end of said vehicle by the conveying chains 29, as conditions may necessitate. It will also be apparent that the elevating members 22 and 23 can also be rotated to shift the logs transversely as desired.

After the desired number of logs has been loaded onto the chassis 2, the vehicle 1 can be driven to any desired point and the logs unloaded therefrom. Unloading of the logs is readily effected by shifting of the lever 15 of the reversing mechanism to a position to cause the direction of travel of the upper run of the chains 29 and 43 to be reversed, and the actual unloading of the logs can be controlled by turning the handle 21 to manipulate the elevating devices 22 and 23 to lower or raise the logs relative to the chains 29 as required. It will be apparent that the chains 29 will successively present the logs to the ramp chains 43 so that the lugs 43ª thereof can engage the rearmost log and carry it onto the ramp 20. The ramp 20 is adjusted to any desired angle by operation of the hydraulic cylinder 63 under the control of the lever 18, as previously described. When the apparatus is used to stack logs in a building, as diagrammatically illustrated in Fig. 14, the ramp 20 will be backed into the building and the logs unloaded and stacked as indicated, the ramp 20 being elevated and lowered as stacking conditions require.

It will be understood that as the ramp 20 is elevated from the position shown in Fig. 1, the ramp 20 will turn about the shaft 28 as a pivot and the rod 49 will slide through the swivel block 53, the result being that the end 48 of said rod is moved to a position in which it is no longer engaged by the arm 47 of the bell crank lever 46. This permits the bell crank lever 46 to pivot upon the shaft 40ª to the limited extent permitted until the arm 55 of said bell crank engages the projection 58, as indicated in Fig. 8. The rotation of the bell crank 46 necessarily carries the pin 56 to a new position providing a different fulcrum point for the fingers 45. The net result is, that the fingers 45 are permitted to move clockwise relative to the skids 34 to an extent greater than when the bell crank arm 47 is engaged with the end 48 of the rod 49. The purpose of providing such additional movement of the fingers 45 during unloading is to enable the logs to be carried by the lugs 43ª onto the upper surface 34ª of the skids 34 and to be discharged therefrom without hindrance by the fingers 45. Thus, a lost motion arrangement is provided enabling the fingers 45 to be retracted so as not to interfere with the discharge of the logs over the ends of the skids 34 at such time as the function of the fingers for lifting the logs onto the ramp chains 43 is not required.

It will be understood that various changes may be made in the arrangement and details of construction of the apparatus disclosed herein without departing from the spirit of the invention or the scope of the annexed claims.

I claim:

1. Apparatus for handling logs and the like, comprising: a vehicle having a chassis; a ramp pivotally mounted on the rear end of said chassis; means including a hydraulic cylinder operatively connected with said ramp for effecting angular movement thereof relative to said chassis; means at the rear end of said ramp for lifting a log off the ground and depositing the same upon said ramp; and a conveyor on said chassis arranged to receive logs from said ramp and to convey the same toward the forward end of said chassis.

2. Apparatus for handling logs and the like, comprising: a vehicle having a chassis; a pair of conveying chains extending longitudinally of said chassis; a ramp pivotally mounted on the rear end of said chassis; a cylinder having a fluid pressure operative piston connected with said ramp for angularly adjusting said ramp relative to said chassis; a pair of chains on said ramp for conveying the logs along said ramp and delivering the same to said conveying chains on said chassis; and means at the rear end of said ramp for lifting a log off the ground and delivering the same to said ramp chains.

3. Apparatus for handling logs and the like, comprising: a vehicle having a chassis; a pair of endless conveying chains extending longitudinally of said chassis; channel members carried by said chassis and engaged with the lower side of the upper run of said conveying chains; a ramp at the rear end of said chassis; a pair of endless ramp chains carried by said ramp for delivering a log to said conveying chains; means carried by said ramp engaging the lower side of the upper run of said ramp chains; and means at the rear end of said ramp for loading a log from the ground onto said ramp chains.

4. Apparatus for handling logs and the like, comprising: a vehicle having a chassis; a pair of endless conveying chains extending longitudinally of said chassis; channel members carried by said chassis supporting the upper run of said conveying chains; a ramp pivotally mounted on the rear end of said chassis; a pair of endless ramp chains provided with spaced lugs carried by said ramp for delivering a log to said conveying chains; means carried by said ramp supporting the upper run of said ramp chains; means at the rear end of said ramp for loading a log from the ground onto said ramp chains; and means connected with said ramp for angularly adjusting the same relative to said chassis.

5. Apparatus for handling logs and the like, comprising: a vehicle having a chassis; a ramp pivotally mounted upon the rear end of said chassis; endless conveyor chains carried by said ramp; spared lugs carried by each of said ramp chains; a pair of loading fingers carried by said ramp at the rear end thereof; means for raising and lowering the rear end of said ramp relative to the ground; and drive means for said loading fingers arranged to effect simultaneous reciprocating and oscillating movement of said fingers to project the same beneath a log on the ground when the ramp is lowered and to raise said log to load said log onto said ramp chains for engagement by a lug on each of said ramp chains to carry said log up said ramp.

6. Apparatus for handling logs and the like comprising: a vehicle having a chassis; a pair of conveying chains carried by said chassis and extending longitudinally thereof; a ramp at the rear end of said chassis; a pair of ramp chains carried by said ramp; means at the rear end of said ramp for lifting a log off the ground and depositing the same upon said ramp chains for transfer to said conveying chains; and means on said chassis for receiving said log from said conveying chains and supporting said log to relieve said conveying chains of the dead weight of said log.

7. Apparatus for handling logs and the like, comprising: a vehicle having a chassis; a pair of conveying chains carried by said chassis and extending longitudinally thereof; a ramp pivotally connected with the rear end of said chassis; means for raising and lowering the free end of said ramp relative to said chassis; a pair of ramp chains carried by said ramp; means at the rear end of said ramp for lifting a log off the ground and depositing the same upon said ramp chains for transfer to said conveying chains; and means on said chassis for receiving said log from said conveying chains and supporting said log to relieve said conveying chains of the dead weight of said log.

8. Apparatus for handling logs and the like, comprising: a vehicle having a chassis; a pair of endless conveying chains carried by said chassis and extending longitudinally and substantially horizontally thereof; means at the rear end of said chassis for loading a log onto said conveying chains; means on said chassis arranged to receive a log from said conveying chains and to support the same; and means for raising and lowering said log supporting means relative to the upper run of said conveying chains.

9. Apparatus for handling logs and the like, comprising: a vehicle having a chassis; a pair of endless conveying chains carried by said chassis and extending longitudinally and substantially horizontally thereof; means on said chassis supporting the upper run of said conveying chains; means at the rear end of said chassis for loading a log onto said conveying chains; means on said chassis arranged to receive a loaded log from said conveying chains and to support the same; and means for raising and lowering said log supporting means relative to the upper run of said conveying chains.

10. Apparatus for handling logs and the like, comprising: a vehicle having a chassis; a pair of conveying chains carried by said chassis and extending longitudinally thereof; a pair of rod members extending longitudinally of said chassis; one adjacent each of said conveying chains; elevating members eccentrically mounted upon said rods and adapted in one operative position thereof to project above the plane of the top surface of the upper run of said conveying chains; and means for rotating said rods.

11. Apparatus for handling logs and the like, comprising: a vehicle having a chassis; a pair of conveying chains carried by said chassis and extending longitudinally thereof; means for loading a log onto said conveying chains; a pair of rods extending longitudinally of said chassis, one adjacent each of said conveying chains; elevating members eccentrically mounted upon said rods and adapted in one operative position thereof to project above the plane of the top surface of the upper run of said conveying chains, whereby to relieve said conveying chains of the dead weight of said log; means operatively interconnecting said rods for simultaneous rotation; and manually operable means for actuating said last-mentioned means.

12. Apparatus for handling logs and the like, comprising: a self-propelled vehicle having a chassis; an engine, a transmission, a power take-off operatively connected with said transmission, and a reversing mechanism operatively connected with said power take-off at the forward end of said chassis; a pair of endless conveying chains extending longitudinally of said chassis and drivingly interconnected with said reversing mechanism; a ramp at the rear end of said chassis; a pair of endless chains on said ramp operatively arranged relative to said conveying chains and driven at the same speed as said conveying chains; means at the rear end of said ramp for lifting a log from the ground and depositing the same upon said ramp chains; and means operatively connected with said ramp including a hydraulic cylinder and piston for angularly adjusting said ramp relative to said chassis.

13. Apparatus for handling logs and the like, comprising: a vehicle having a chassis; conveying means carried by said chassis including a first and second shaft, a pair of sprockets mounted upon each of said shafts and a pair of endless conveying chains extending over the sprockets on said shafts; a ramp at the rear end of said chassis including plate members pivotally mounted upon said second shaft and projecting downwardly below said shaft, frame members rigidly secured to the upper and lower ends of each of said plate members, and skids secured to the forward end of said frame members; a third shaft journaled in said skid members; a pair of sprockets secured to said second shaft and a pair of sprockets secured to said third shaft; endless ramp chains operatively interconnecting said two last-mentioned pairs of sprockets and arranged to deliver a log to said conveying chains; a pair of loading fingers mounted upon said third shaft for lifting a log from the ground and depositing the same upon said ramp chains; means for imparting reciprocating and oscillating movement to said lifting fingers to project the same under a log and to thereafter raise the log from the ground onto said ramp chains; and means for angularly adjusting said ramp with respect to said chassis.

14. Apparatus for handling logs and the like, comprising: a vehicle having a chassis; a ramp pivotally mounted at its forward end upon the rear end of said chassis; shafts disposed at the opposite ends of said ramp; a pair of sprockets mounted upon each of said shafts; ramp chains interconnecting said last-mentioned pairs of sprockets; spaced lugs carried by each of said ramp chains; a pair of eccentrics mounted upon the shaft at the rear end of said ramps; a pair of loading fingers actuated by said eccentrics, each of said fingers having an elongated slot formed therein on the forward side of said last-mentioned shaft; a pair of bell cranks pivotally mounted upon said last-mentioned shaft; a pin carried by one arm of each of said bell cranks and projecting into the slot of one of said fingers; a pair of rods extending rearwardly from a fixed point relative to said chassis and having the rear end thereof engaged by the other arm of said bell cranks to prevent substantial turning of said bell cranks in one operative position of said ramp; and means for raising and lowering the rear end of said ramp relative to the ground, said eccentrics and the pins of said bell cranks being operable upon rotation of said eccentrics to effect simultaneous reciprocating and oscillating movement of said fingers to project the same beenath a log on the ground when the ramp is lowered and raise said log to load said log onto said ramp chains for engagement by a lug on each of said ramp chains to convey said log up said ramp.

15. Apparatus for handling logs and the like, comprising: a vehicle having a chassis including a pair of side members, a shaft extending transversely of said side members near the forward end thereof, means on said chassis for driving said shaft, a second shaft at the rear end of said side members, a pair of sprockets mounted upon each of said shafts, and endless conveying chains interconnecting the sprockets of the respective shafts; a ramp pivotally mounted at its forward end upon said second shaft; a third shaft carried by the rear end of said ramp; a second pair of sprockets mounted upon said second shaft, and a pair of sprockets mounted upon said third shaft; endless ramp chains interconnecting said two last-mentioned pairs of sprockets; lugs carried by each of said ramp chains at spaced intervals; a pair of eccentrics mounted upon said third shaft; a pair of loading fingers actuated by said eccentrics, each of said fingers having an elongated slot formed therein on the forward side of said third shaft; a pair of bell cranks pivotally mounted upon said third shaft; a pin carried by one arm of each of said bell cranks and projecting into the slot of one of said fingers; a pair of rods extending rearwardly from a fixed point relative to said chassis and having the rear end thereof engaged by the other arm of said bell cranks to prevent turning of said bell cranks in one operative position of said ramp; ground-engaging skids carried by the rear end of said ramp; and means for raising and lowering the rear end of said ramp relative to the ground, said eccentrics and the pins of said bell cranks being operable upon rotation of said eccentrics to effect simultaneously reciprocating and oscillating movement of said fingers to project the same beneath a log on the ground when the ramp is lowered and raise said log to load said log onto said ramp chains for engagement by a lug on each of said ramp chains to convey said log up said ramp for delivery to said conveying chains.

ROBERT S. ROGERS, Jr.

REFERENCES CITED

The following references are of record in the file of this patent:

UNITED STATES PATENTS

| Number | Name | Date |
| --- | --- | --- |
| 1,444,604 | Haney | Feb. 6, 1923 |
| 1,655,686 | Artas | Jan. 10, 1928 |
| 1,261,967 | Stoltze | Apr. 9, 1918 |
| 2,357,600 | Pabst | Sept. 5, 1944 |
| 1,741,292 | Gillmet | Dec. 31, 1929 |
| 1,704,841 | Sacerdote | Mar. 12, 1929 |
| 2,353,655 | Day | July 18, 1944 |
| 1,481,712 | Huckins | Jan. 22, 1924 |
| 2,282,704 | Butters | May 12, 1942 |
| 1,739,624 | Whomond | Dec. 17, 1929 |
| 1,862,682 | Judd | June 14, 1932 |

FOREIGN PATENTS

| Number | Country | Date |
| --- | --- | --- |
| 634,892 | French | Mar. 1, 1928 |
| 346,559 | German | Jan. 2, 1922 |